(12) United States Patent
Keller

(10) Patent No.: US 8,261,708 B2
(45) Date of Patent: Sep. 11, 2012

(54) CONTROL VALVE MOUNTING SYSTEM

(75) Inventor: Robert D. Keller, Davisburg, MI (US)

(73) Assignee: Eaton Corporation, Cleveland, OH (US)

(*) Notice: Subject to any disclaimer, the term of this patent is extended or adjusted under 35 U.S.C. 154(b) by 115 days.

(21) Appl. No.: 12/755,992

(22) Filed: Apr. 7, 2010

(65) Prior Publication Data

US 2011/0247580 A1    Oct. 13, 2011

(51) Int. Cl.
*F01M 9/10* (2006.01)

(52) U.S. Cl. ............ 123/90.38; 123/90.16; 123/90.17

(58) Field of Classification Search ........... 123/90.38, 123/90.16, 90.17, 195 C
See application file for complete search history.

(56) References Cited

U.S. PATENT DOCUMENTS

| | | | |
|---|---|---|---|
| 5,263,386 A | 11/1993 | Campbell et al. | |
| 5,269,490 A | 12/1993 | Fujikawa et al. | |
| 5,771,850 A | 6/1998 | Okada | |
| 5,967,121 A * | 10/1999 | Pirch et al. | 123/470 |
| 6,006,708 A | 12/1999 | Ken et al. | |
| 6,014,952 A | 1/2000 | Sato et al. | |
| 6,035,818 A | 3/2000 | Sato et al. | |
| 6,109,225 A | 8/2000 | Ogita et al. | |
| 6,131,541 A | 10/2000 | Hasegawa et al. | |
| 6,135,077 A | 10/2000 | Moriya et al. | |
| 6,170,448 B1 | 1/2001 | Asakura | |
| 6,209,515 B1 | 4/2001 | Gotoh et al. | |
| 6,240,354 B1 | 5/2001 | Yamada et al. | |
| 6,244,230 B1 | 6/2001 | Mikame | |
| 6,298,813 B1 | 10/2001 | Asakura et al. | |
| 6,386,164 B1 | 5/2002 | Mikame et al. | |
| 6,478,000 B2 | 11/2002 | Ishii et al. | |
| 6,591,796 B1 | 7/2003 | Scott | |
| 6,684,836 B2 | 2/2004 | Inoue | |
| 6,810,842 B2 | 11/2004 | Itou | |
| 7,004,138 B2 | 2/2006 | Keller et al. | |
| 7,044,400 B2 | 5/2006 | Luedicke | |
| 7,121,243 B2 | 10/2006 | Yoshijima et al. | |
| 7,162,986 B2 | 1/2007 | Yoshijima et al. | |
| 7,341,033 B2 | 3/2008 | Yoshijima et al. | |
| 7,360,516 B2 | 4/2008 | Inoue et al. | |
| 7,373,912 B2 | 5/2008 | Self et al. | |
| 2004/0144349 A1 | 7/2004 | Wampula et al. | |
| 2006/0011158 A1 | 1/2006 | Yoshijima et al. | |
| 2006/0112922 A1 | 6/2006 | Yoshijima et al. | |

(Continued)

FOREIGN PATENT DOCUMENTS

DE    19621221    11/1997

(Continued)

OTHER PUBLICATIONS

Nishihara, Setsuo et al., "Newly Developed V6 MIVEC Gasoline Engine," Mitsubishi Motors Technical Review, 2007, No. 19, pp. 71-74.

(Continued)

*Primary Examiner* — Zelalem Eshete
(74) *Attorney, Agent, or Firm* — Dierker & Associates, P.C.

(57) ABSTRACT

A system for mounting a control valve on an engine includes an engine head operatively disposed on a cylinder block of the engine. The engine head has one or more open receptacles. A retainer is operatively configured to hold the control valve in the open receptacle. The retainer is further configured to be removeably engaged with the open receptacle. The retainer is co-axial with the open receptacle.

16 Claims, 3 Drawing Sheets

U.S. PATENT DOCUMENTS

| | | |
|---|---|---|
| 2007/0095315 A1 | 5/2007 | Hoppe et al. |
| 2007/0113812 A1 | 5/2007 | Yoshijima et al. |
| 2007/0266967 A1 | 11/2007 | Shirabe et al. |
| 2008/0088095 A1 | 4/2008 | Yoshijima et al. |

FOREIGN PATENT DOCUMENTS

| | | |
|---|---|---|
| DE | 10015911 | 10/2001 |
| DE | 10223431 | 12/2003 |
| DE | 102007049405 | 5/2008 |
| DE | 102007011892 | 9/2008 |
| DE | 102007042046 | 3/2009 |
| GB | 2191256 | 12/1987 |
| WO | WO 03/067038 | 8/2003 |
| WO | WO 2007/096241 | 8/2007 |
| WO | WO 2010/043514 | 4/2010 |

OTHER PUBLICATIONS

"The Tundra's 5.7 VVT-i System Explained," www.TundraHeadquarters.com, May 26, 2008, 2 pages.

International Search Report for Application No. PCT/USIB2011/000741 dated Oct. 5, 2011 (13 pages).

\* cited by examiner

CONTROL VALVE MOUNTING SYSTEM

BACKGROUND

The present disclosure relates generally to a device for retaining a control valve on an engine.

In the internal combustion engine, timing of intake valve and exhaust valve operation is controlled in order to improve the performance of an engine. In a method generally employed for controlling the valve timing, a rotational phase with respect to a camshaft of an overhead camshaft (OHC) mounted on an upper portion of the engine is hydraulically controlled by a variable valve timing system mounted on a shaft end of the overhead camshaft. A control valve may control hydraulic pressure to the variable valve timing system.

In general, the control valve is a solenoid valve, which may be installed in the vicinity of a bearing of the overhead camshaft of a cylinder head. A traditional control valve 54 mounting system 46 is shown in FIG. 1. This control valve 54 mounting system 46 implements a plate 48 which is affixed to the engine 50 through the use of a fastener 52. The plate 48 occupies packaging space as it holds the control valves 54 in place. When a control valve 54 is to be replaced, a technician must remove the fastener 52 and remove the large plate 48 for the engine in order to replace a single control valve 54.

SUMMARY

A system for mounting a control valve on an engine according to embodiment(s) as disclosed herein includes an engine head operatively disposed on a cylinder block of the engine. The engine head has at least one open receptacle. A retainer is operatively configured to hold the control valve in the at least one open receptacle, and to be removably engaged with the at least one open receptacle in the engine head. The retainer is co-axial with the at least one open receptacle.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

The present disclosure provides a relatively simple and time- and/or cost-effective system 10 for mounting a control valve 12 onto an engine head 14.

Figure 1:
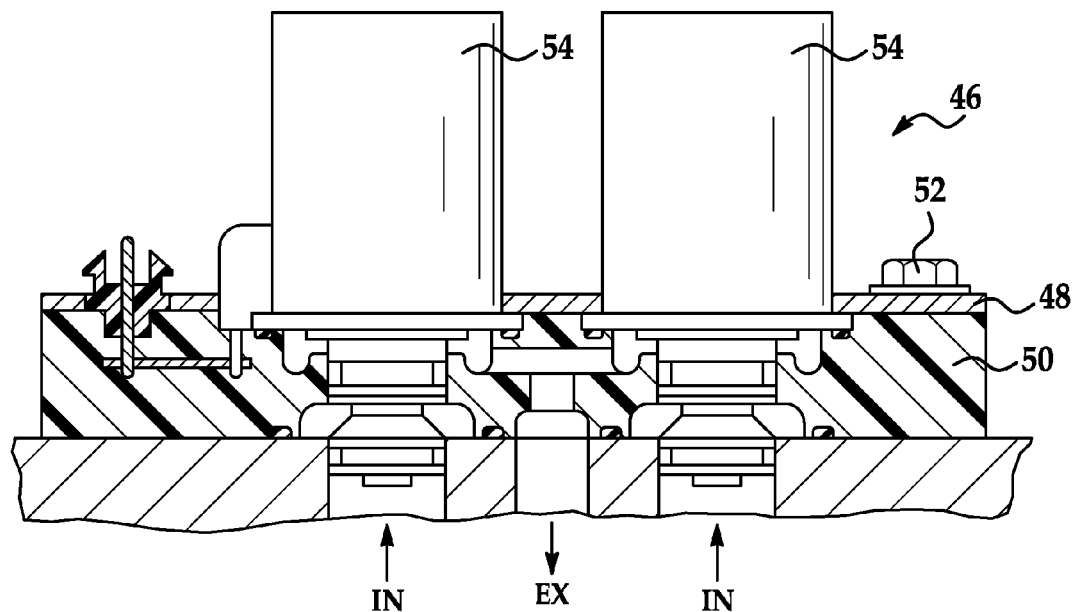
FIG. 1 is a cutaway, cross sectional view of a prior art mounting system for a control valve assembly.

The task of removing fasteners 52 (shown in FIG. 1) and the plate 48 (shown in FIG. 1) in order to assemble or replace one or more control valves 54 may result in an inefficient repair and assembly process in addition to a complicated and expensive design with inefficient use of packaging space. Accordingly, the system and method disclosed herein substantially and advantageously overcome at least the potential drawbacks noted in the background above.

Figure 2:
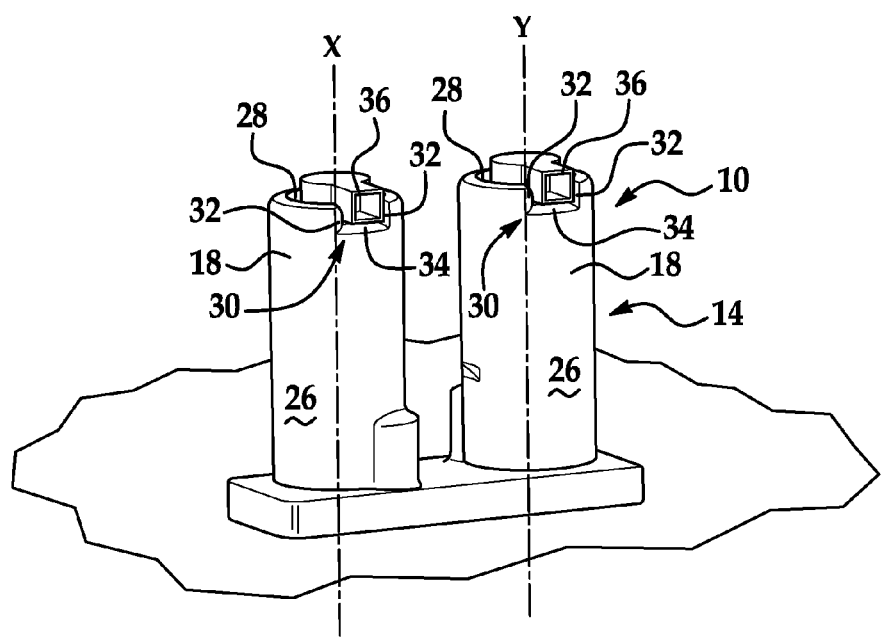
FIG. 2 is a cutaway, perspective view of an embodiment of the present disclosure.
Figure 3:
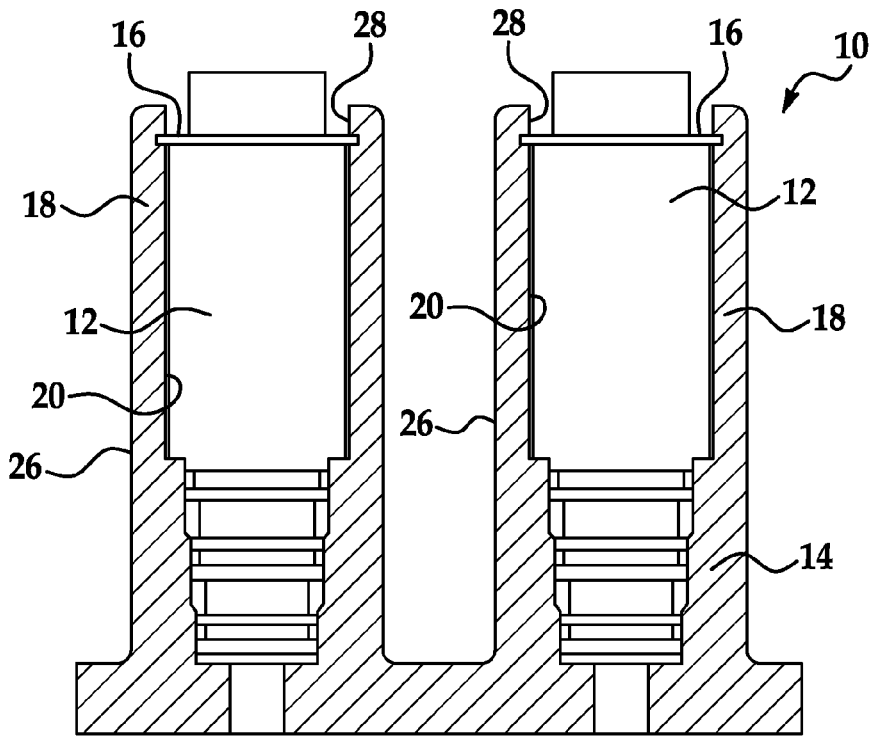
FIG. 3 is a cross-sectional view of an embodiment of the present disclosure.
Figure 4:
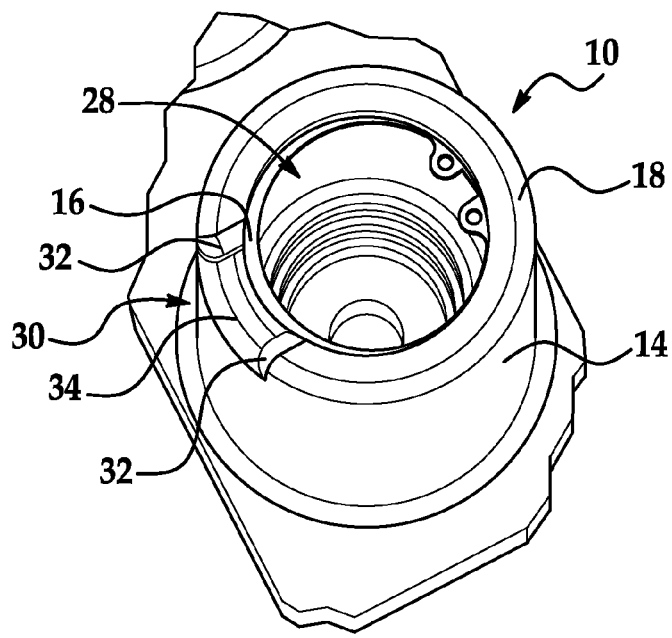
FIG. 4 is a cutaway, top, perspective view of the embodiment shown in FIGS. 2 and 3 with the control valve removed and the retainer ring installed.

Referring now to FIGS. 2-6, the mounting system 10 generally includes a retainer 16 and an engine head 14 having at least one open receptacle 18. As shown in FIG. 2, the receptacle 18 of the engine head 14 may include at least one open-ended, substantially cylindrical structure integral to the engine head 14. The receptacle 18 is operatively configured to hold a control valve 12 and the retainer 16. The retainer 16 may be a ring-like structure as shown generally in FIGS. 3 and 4. The retainer 16 is operatively configured to hold a control valve 12. The retainer 16 is also operatively configured to be removeably engaged with the at least one open receptacle 18 in the engine head 14. In particular, the physical configuration of the retainer 16 is intended to mate with the complementary physical configuration of the receptacle 18. A non-limiting complementary physical configuration of the receptacle 18 may be a groove 22, as shown in FIGS. 5D and 5E. It is to be understood that the retainer 16 may be co-axial with the open receptacle 18, as shown in FIGS. 3 and 4.

It is also to be understood that the retainer 16 may be rigid or resilient in structure. A non-limiting example of a retainer 16 with a resilient structure is the snap ring 16', 16" shown in FIGS. 4 and 5A-5E. The snap ring 16', 16" may be distorted from its free state in order to install it onto the engine head 14, or to remove the snap ring 16', 16" from the engine head 14.

Furthermore, the retainer 16 may be disposed inside of the open receptacle 18 as shown in FIG. 4, or the retainer 16 may be disposed outside of the open receptacle 18 to engage the open receptacle 18 and the control valve 12 so as to hold the control valve 12 in position (not shown). Regardless of whether the retainer 16 is disposed inside or outside of the open receptacle 18 of the engine head 14, the retainer 16 engages with a complementary surface of the open receptacle 18 to secure the retainer 16 in position.

Figure 5A:
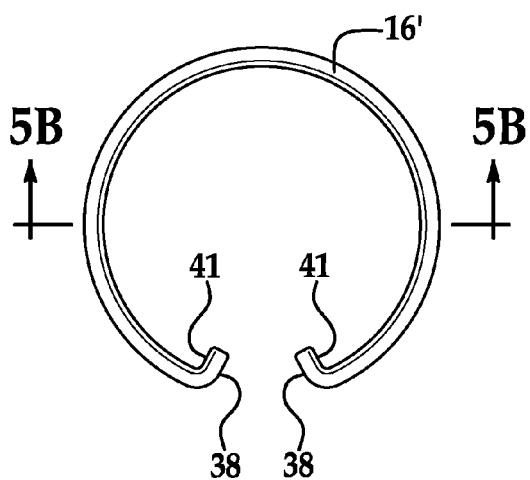
FIG. 5A is a top view of an embodiment of the retainer ring of the present disclosure.
Figure 5B:
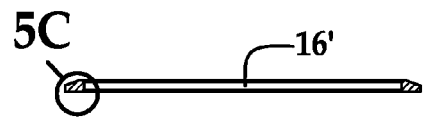
FIG. 5B is a cross sectional view of the retainer ring taken along line 5B-5B in FIG. 5A.
Figure 5C:
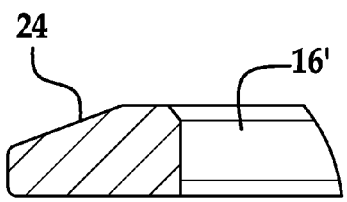
FIG. 5C is an enlarged cutaway cross sectional view of the portion of the retainer ring shown in circle 5C-5C of FIG. 5B.
Figure 5D:
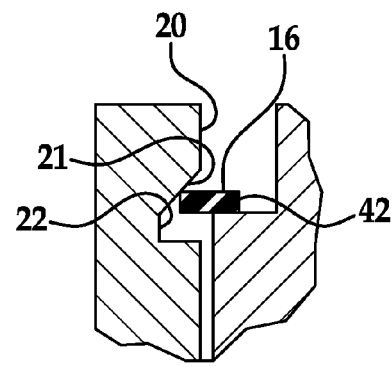
FIG. 5D is an enlarged, cutaway, partial cross sectional view of another embodiment of the retainer.
Figure 5E:
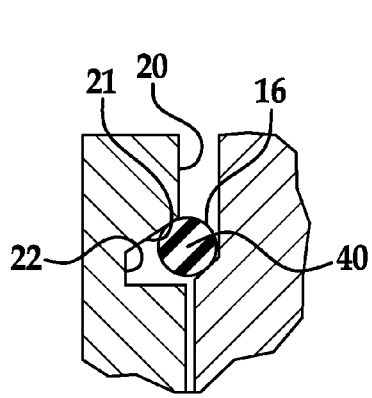
FIG. 5E is an enlarged, cutaway, partial cross sectional view of yet another embodiment of the retainer.

As indicated, a non-limiting example of securing the retainer 16 into position is shown in FIGS. 5D and 5E. The retainer 16 is shown in position within the open receptacle 18. The open receptacle 18 includes an interior side wall 20 having a groove 22 defined in the interior side wall 20. The groove 22 is configured to receive the retainer 16. The groove 22 may include an angled surface 21 which engages with the retainer 16. As a spring bias in retainer 16 causes a diameter of retainer 16 to increase as the retainer 16 moves toward its free state, angled surface 21 forces the retainer 16, and thus the control valve 12 to a seated position. Angled surface 21 may be configured to cooperate with retainer 16 so as to prevent a hydraulic pressure exerted on the control valve 12 from overcoming the spring bias in retainer 16. The cooperation of angled surface 21 and retainer 16 may further take up tolerance for manufacturing variation, thus keeping the control valve 12 tightly in the seated position.

Referring now to FIG. 5C, the retainer 16, 16' may be further configured to have a bevel 24 to interface with the groove 22 in the interior side wall 20 of the open receptacle 18. The bevel 24 may facilitate the installation process of the retainer 18 into the groove 22 given that the bevel 24 allows for easy insertion of the retainer 16, 16' into the groove 22. As a spring bias in retainer 16, 16' causes the diameter of retainer 16, 16' to increase as the retainer 16, 16' moves toward its free state, bevel 24 (in a manner similar to that of angled surface 21) forces control valve 12 to a seated position. Bevel 24 may be configured to cooperate with groove 22 so as to prevent a hydraulic pressure exerted on the control valve 12 from overcoming the spring bias in retainer 16, 16'. The cooperation of bevel 24 and groove 22 may further take up tolerance for manufacturing variation, thus keeping the control valve 12 tightly in the seated position.

It is to be understood that the groove 22 identified above may be defined on the outside side wall 26 of the receptacle or on the interior side wall 20. However, it is to be understood that where the retainer 16 is to be secured well below the opening 28 of the receptacle and outside of the receptacle, at least one aperture in the open receptacle 18 may allow the retainer 16 to engage with the control valve 12 that is disposed at least partially within the open receptacle 18.

Referring now to FIGS. 2 and 4, the engine head 14 may further include a connector locator portion 30. The connector locator portion 30 may be located at or proximate the opening 28 for the open receptacle 18. The connector locator portion 30 may further include side walls 32 and a base 34 that are integral to the open receptacle 18. The width of the base 34 and the height of the side walls 32 may complement the dimensions of an electrical connector 36 disposed on the control valve 12. The connector locator portion 30 may prevent the control valve 12 from rotating about a longitudinal axis X, Y through the control valve 12. It is to be understood that the electrical connector 36 has a fixed location on the control valve 12, and the side walls 32 of the connector locator portion 30 prevent movement of the electrical connector 36 and hence, substantially prevent rotation of the control valve 12 about the longitudinal axis X, Y through the control valve 12. Referring now to FIG. 5A, the retainer 16 in the non-limiting example of a snap ring 16' includes a pair of end portions 38. The end portions 38 may be accessed from outside of the open receptacle 18 of the engine head 14 to disengage the retainer 16 and its associated control valve 12 from the open receptacle of the engine head 14. The pair of end portions 38 may include hooks 41 that may provide engagement points for an installation/removal tool (not shown).

Figure 6:
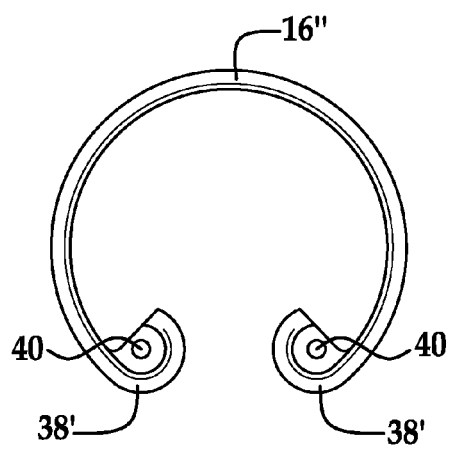
FIG. 6 is a top view of another embodiment of the retainer.

With reference to FIG. 6, it is to be understood that the end portions 38' of a snap ring 16'' of the present disclosure may include end portions 38' that define apertures 40. However, the end portions 38, 38' may also be of a variety of other configurations, of which the end portions 38, 38' shown in FIG. 5A and FIG. 6 are two non-limiting examples.

The retainer 16 may be beveled snap ring 16' as shown in FIGS. 5A, 5B, and 5C. The beveled configuration of the retainer 16, 16' may include a bevel 24 as shown in FIG. 5C where the bevel 24 may engage with the groove 22 in the interior side wall to provide a secure fit between the retainer 16, 16' and the groove 22. It is also to be understood that the retainer 16 may have a circular cross section 40 as shown in FIG. 5E or a rectangular cross section 42 as shown in FIG. 5D. As indicated, regardless of whether the retainer 16 has a circular cross section 40, a rectangular cross section 42, or a bevel 24, the retainer 16, 16' is intended to engage with groove 22.

Referring back to FIG. 5A, the retainer 16, 16' may be distorted from its free state to remove the retainer 16, 16' from the open receptacle 18 of the engine head 14. In order to remove the retainer 16, 16' and the control valve 12 retained by the retainer 16, 16', the end portions 38 of the retainer 16, 16' may be drawn toward each other to decrease the diameter of the retainer 16, 16', thereby making the retainer 16, 16' removable from the open receptacle 18.

Where the retainer 16 is rigid, rather than resilient, the retainer 16 may be inserted in the groove 22 of the open receptacle 18 and may engage a complementary locking structure (not shown) to secure the retainer 16 and the control valve 12 retained by the retainer 16.

While multiple embodiments have been described in detail, it will be apparent to those skilled in the art that the disclosed embodiments may be modified. Therefore, the foregoing description is to be considered exemplary rather than limiting.

What is claimed is:

1. A system for mounting a control valve on an engine, the mounting system comprising:
    an engine head operatively disposed on a cylinder block of the engine, the engine head having at least one open receptacle and a connector locator portion, wherein the connector locator portion is to operatively engage an electrical connector having a fixed location on the control valve, thereby substantially preventing rotation of the control valve about a longitudinal axis through the control valve; and
    a retainer operatively configured to hold the control valve in a seated position in the at least one open receptacle and to operatively oppose hydraulic pressure exerted on the control valve, and to be removeably engaged with the at least one open receptacle, the retainer being co-axial with the at least one open receptacle.

2. A system for mounting a control valve on an engine, the mounting system comprising:
    an engine head operatively disposed on a cylinder block of the engine, the engine head having at least one open receptacle and a connector locator portion, wherein the connector locator portion further comprises a slot defined at or proximate to an opening of the open receptacle, the slot being integral to the open receptacle, the slot having opposed side walls and a base disposed between the opposed side walls, wherein the slot is to operatively engage and locate an electrical connector disposed on the control valve; and
    a retainer operatively configured to hold the control valve in the at least one open receptacle, and to be removeably engaged with the at least one open receptacle, the retainer being co-axial with the at least one open receptacle;
    wherein the open receptacle defines a groove operatively configured to engage with the retainer.

3. The mounting system as defined in claim 2 wherein the retainer comprises a resilient snap ring.

4. The mounting system as defined in claim 3 wherein the snap ring includes a pair of end portions configured to be accessible from outside of the engine head to disengage the snap ring from the engine head.

5. The mounting system as defined in claim 4 wherein the pair of end portions defines apertures therein.

6. The mounting system as defined in claim 5 wherein each of the pair of end portions is configured to be drawn toward the other to remove the snap ring from the engine head.

7. The mounting system as defined in claim 3 wherein the snap ring is a beveled retaining ring.

8. The mounting system as defined in claim 3 wherein the groove includes an angled surface to engage with the resilient snap ring.

9. The mounting system as defined in claim 3 wherein the snap ring has a circular cross section.

10. The mounting system as defined in claim 4 wherein the snap ring is configured to be distorted from its free state to remove the retainer from the engine head.

11. The mounting system as defined in claim 3 wherein the snap ring has a rectangular cross section.

12. The mounting system as defined in claim 2 wherein the retainer is rigid and the retainer is to engage a complementary locking structure to secure the retainer and the control valve retained by the retainer.

13. A system for mounting a control valve on an engine, the mounting system comprising:

an engine head operatively disposed on a cylinder block of the engine, the engine head having at least one open receptacle and a connector locator portion, wherein the connector locator portion is to operatively engage an electrical connector having a fixed location on the control valve, thereby substantially preventing rotation of the control valve about a longitudinal axis through the control valve; and a retainer operatively configured to hold the control valve in the at least one open receptacle, and to be removeably engaged with the at least one open receptacle, the retainer being co-axial with the at least one open receptacle, the open receptacle defining a groove operatively configured to engage with the retainer;

wherein the retainer is a resilient snap ring, the snap ring including a pair of end portions configured to be accessible from outside of the engine head to disengage the snap ring from the engine head, each of the pair of end portions being configured to be drawn toward the other to remove the snap ring from the engine head;

and wherein the snap ring is configured to be distorted from its free state to remove the retainer from the engine head.

14. The mounting system as defined in claim 13 wherein the snap ring is a beveled retaining ring.

15. The mounting system as defined in claim 14 wherein the groove includes an angled surface to engage with the resilient snap ring.

16. The mounting system as defined in claim 13 wherein the snap ring has one of a circular cross section or a rectangular cross section.

* * * * *